(No Model.)
T. HANSON.
FLUID PRESSURE REGULATOR.
No. 474,244. Patented May 3, 1892.
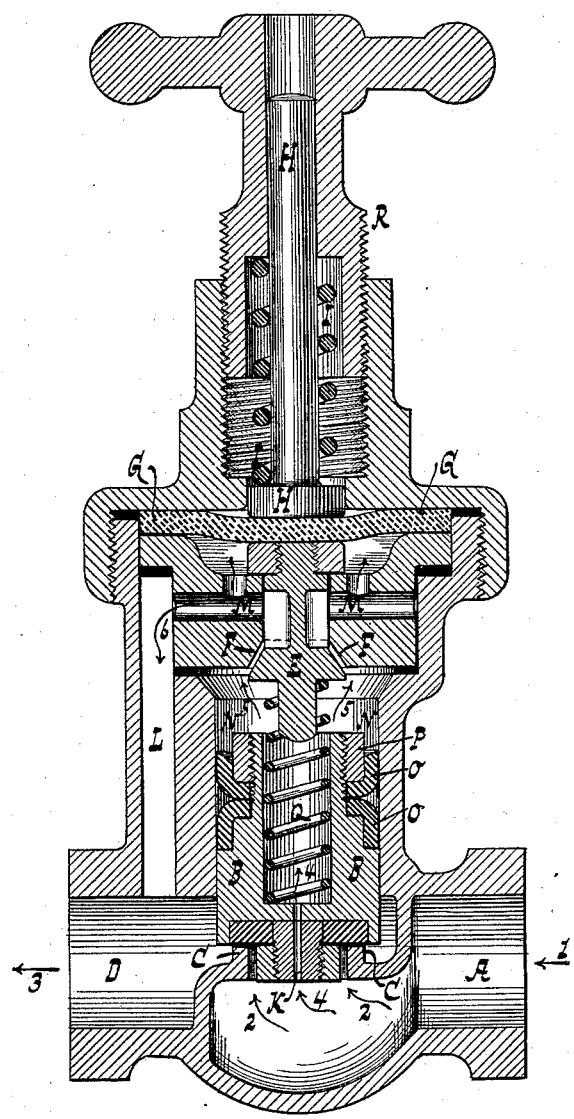
WITNESSES:
William Miller
Edward Wolff
INVENTOR:
Thomas Hanson.
BY
Van Santvoord & Hauff
his ATTORNEYS

UNITED STATES PATENT OFFICE.

THOMAS HANSON, OF NEW YORK, N. Y.

FLUID-PRESSURE REGULATOR.

SPECIFICATION forming part of Letters Patent No. 474,244, dated May 3, 1892.

Application filed July 2, 1891. Serial No. 398,243. (No model.)

*To all whom it may concern:*

Be it known that I, THOMAS HANSON, a citizen of the United States, residing at New York, in the county and State of New York, have invented new and useful Improvements in Pressure-Reducers for Pipes, of which the following is a specification.

This invention relates to an improvement in devices for reducing the pressure in delivery-pipes of water, gas, steam, or other fluids; and the invention consists in the details of construction set forth in the following specification and claims and illustrated in the annexed drawing, in which is shown a sectional elevation of the pressure-reducer.

In the drawing the letter A indicates an inlet by which the fluid enters, as indicated by arrow 1, and said fluid forces the piston or valve B from its seat C, so that the fluid can pass through seat C, as indicated by arrow 2, and flow thence through outlet D, as shown by arrow 3. The outlet D connects with the service-pipe. (Not shown.)

The valve E has its seat at F, and said valve is pressed from its seat by a diaphragm G, acted on by a stem H, which is pressed by spring I. When the valve E is forced from its seat, part of the fluid from inlet A, passing through the channel or perforation K in the piston or plunger B, as indicated by arrow 4, will pass through valve-seat F, as indicated by arrow 5, and thence into chamber M and channel or passage L, as indicated by arrow 6. On leaving channel L the fluid joins the service-fluid passing through outlet D.

When the service-pipe is closed, the outflow through D stops, and the pressure of inflowing water exerted in chamber M and in the space N above the plunger or valve B is then so powerful as to move the diaphragm G against the pressure of spring I, whereupon the valve E closes on its seat F and stops the flow through channel L. At the same time the pressure of the fluid in chamber N forces the piston or plunger B onto its seat C, so as to prevent the flow through said seat C to outlet D. The fluid is thus shut off from outlet D and from the service-pipe connecting with said outlet, so that the service-pipe is relieved from pressure.

The plunger or valve B is made tight by packing composed of two disks or washers O O, having their edges extended in opposite directions and secured by a nut P. The spring Q is interposed between the two valves B and E, the upper end of the spring bearing against the upper valve E and the lower end of the spring bearing against the lower valve B in such manner that the one spring constantly tends to press the two valves in opposite directions to their valve-seats. The screw R can be made to regulate the pressure of spring I. The packing O prevents any fluid which passes from the perforation K into chamber N from passing down on the outside of piston B to outlet D, so that no pressure can be caused in the service-pipe when the latter is shut.

What I claim as new, and desire to secure by Letters Patent, is—

1. A pressure-reducer having an inlet A, an outlet D, and a chamber N, a perforated valve or piston B in said chamber, a passage L, leading from the chamber to the outlet, a valve E, having the seat F, a regulator or diaphragm G, a spring Q, interposed between the two valves and acting to constantly press them in opposite directions to their valve-seats, a spring I, acting on the regulator or diaphragm, and an adjusting-screw R, substantially as described.

2. A pressure-reducer having an inlet A, an outlet D, and a chamber N, a perforated valve or piston B in said chamber, a passage L, leading from the chamber to the outlet, a valve E, having the seat F, a spring-pressed regulator or diaphragm G, and a spring Q, interposed between the two valves and acting to constantly press them in opposite directions to their valve-seats, substantially as described.

In testimony whereof I have hereunto set my hand in the presence of two subscribing witnesses.

THOMAS HANSON.

Witnesses:
FRANK B. HANSON,
E. F. KASTENHUBER.